(12) United States Patent
Gueneau et al.

(10) Patent No.: US 8,815,378 B2
(45) Date of Patent: Aug. 26, 2014

(54) SUBSTRATE HAVING A PHOTOCATALYTIC COATING

(75) Inventors: Lethicia Gueneau, Vincennes (FR); Mauricette Rondet, Vitry sur Seine (FR); Eric Mattmann, Paris (FR)

(73) Assignee: Saint Gobain Glass France, Courbevoie (FR)

( * ) Notice: Subject to any disclaimer, the term of this patent is extended or adjusted under 35 U.S.C. 154(b) by 862 days.

(21) Appl. No.: 11/579,865

(22) PCT Filed: May 10, 2005

(86) PCT No.: PCT/FR2005/050307
§ 371 (c)(1),
(2), (4) Date: Mar. 9, 2007

(87) PCT Pub. No.: WO2005/110937
PCT Pub. Date: Nov. 24, 2005

(65) Prior Publication Data
US 2007/0218264 A1 Sep. 20, 2007

(30) Foreign Application Priority Data

May 10, 2004 (FR) ..................................... 04 50895

(51) Int. Cl.
| | | |
|---|---|---|
| *B32B 7/02* | (2006.01) | |
| *C03C 17/23* | (2006.01) | |
| *B05D 7/04* | (2006.01) | |
| *G02B 5/28* | (2006.01) | |
| *B32B 3/26* | (2006.01) | |
| *C03C 17/34* | (2006.01) | |
| *G02F 1/1333* | (2006.01) | |
| *G02B 1/04* | (2006.01) | |
| *G02B 1/11* | (2006.01) | |

(52) U.S. Cl.
CPC ... *B32B 3/26* (2013.01); *B32B 7/02* (2013.01); *C03C 17/3417* (2013.01); *C03C 17/3435* (2013.01); *C03C 2217/71* (2013.01); *C03C 2217/734* (2013.01); *G02F 1/1333* (2013.01); *G02F 1/133305* (2013.01); *G02B 1/04* (2013.01); *G02B 1/11* (2013.01); *G02B 1/113* (2013.01); *G02B 1/115* (2013.01)
USPC ........... 428/216; 428/212; 428/220; 428/701; 428/704; 428/304.4; 428/307.3; 428/312.6; 428/317.9; 359/580; 359/586; 359/589; 359/601; 351/159.62; 427/372.2; 427/419.3

(58) Field of Classification Search
CPC ............ C03C 17/3417; C03C 17/3435; C03C 2217/71; C03C 2217/734; B32B 7/02; B32B 3/26; G02F 1/1333; G02F 1/133305; G02B 1/00; G02B 1/04; G02B 1/11; G02B 1/111; G02B 1/113; G02B 1/115; G02B 1/112
USPC .......... 385/129–131; 423/700–703, 710–711; 428/212–220, 688–704, 304.4–317.9; 359/580, 586, 589, 601; 351/159.62; 427/372.2, 419.3
See application file for complete search history.

(56) References Cited

U.S. PATENT DOCUMENTS

| | | | | |
|---|---|---|---|---|
| 4,112,032 | A * | 9/1978 | Blaszyk et al. | ................. 264/42 |
| 5,271,960 | A * | 12/1993 | Proscia | ......................... 427/164 |
| 6,037,289 | A * | 3/2000 | Chopin et al. | .................... 502/2 |
| 6,103,363 | A | 8/2000 | Boire et al. | |
| 2002/0150681 | A1* | 10/2002 | Boire et al. | ............. 427/255.36 |
| 2003/0215648 | A1 | 11/2003 | Varanasi et al. | |
| 2004/0043260 | A1 | 3/2004 | Nadaud et al. | |
| 2004/0180220 | A1 | 9/2004 | Gueneau et al. | |
| 2004/0219348 | A1* | 11/2004 | Jacquiod et al. | ........... 428/304.4 |
| 2006/0014050 | A1 | 1/2006 | Gueneau et al. | |
| 2006/0165963 | A1 | 7/2006 | Fleury et al. | |

FOREIGN PATENT DOCUMENTS

| | | |
|---|---|---|
| EP | 1 291 331 | 3/2003 |
| EP | 1 300 374 | 4/2003 |
| FR | 2 838 734 | 10/2003 |
| FR | 2 841 894 | 1/2004 |
| WO | WO 02/24971 A1 | 3/2002 |
| WO | WO 03/087002 A1 | 10/2003 |
| WO | WO 2004/005210 A2 | 1/2004 |

OTHER PUBLICATIONS

Dai et al. "Enhanced Photocatalytic Activity of Titanium Dioxide Supported on Hexagonal Mesoporous Silica at Lower Coverage". Journal of Inclusion Phenomena and Macrocyclic Chemistry, 35: 11-21, 1999.*
Dobrowolski, J.A. (eds. Bass et al.). "Handbook of Optics: vol. I, Fundamentals, Techniques and Design". Chapter 42, McGraw-Hill, (1995); pp. 42.3-42.130.*
U.S. Appl. No. 10/585,136, filed Jun. 30, 2006, Gueneau, et al.
U.S. Appl. No. 11/578,035, filed Oct. 12, 2006, Kharchenko, et al.
U.S. Appl. No. 11/547,795, filed Oct. 6, 2006, Nadaud, et al.

* cited by examiner

*Primary Examiner* — Prashant J Khatri
(74) *Attorney, Agent, or Firm* — Oblon, Spivak, McClelland, Maier & Neustadt, L.L.P.

(57) ABSTRACT

The invention relates to a transparent or semi-transparent substrate having, over at least a portion of at least one of its surfaces, a photocatalytic coating based on titanium oxide and characterized in that the coated surface has a luminous reflectance less than that of a non-coated surface of the substrate. The invention also relates to methods for obtaining a substrate of this type and to uses for this substrate.

21 Claims, No Drawings

SUBSTRATE HAVING A PHOTOCATALYTIC COATING

The present invention relates to at least partially transparent substrates provided with a photocatalytic coating, the method for obtaining such a coating, the products obtained, and the various applications of said products.

It relates more particularly to substrates having both an antireflection function and a photocatalytic coating.

The coatings of the invention thereby serve to confer novel functionalities on the materials supporting them, by particularly combining anti-soiling, fungicidal or bactericidal properties with light reflection reduction properties.

The substrates of the present invention are transparent or semitransparent, inorganic or organic, substrates such as glasses or glass-ceramics or various rigid or flexible polymers.

In fields as varied as glazing for shop windows or counters, windows for automobiles such as windshields, or ophthalmic lenses, a need has appeared in recent years to decrease the light reflectance. This need stems from essentially esthetic reasons, particularly in the case of shop or museum windows, when it is important to highlight the objects located behind the windows, or in the case of ophthalmic lenses. In the latter case, the use of antireflection films is vitally important because, owing to the steadily decreasing thickness of the lenses, high refractive index (and therefore high reflectance) polymers are increasingly employed. Safety reasons may also justify the need to decrease the light reflectance of the transparent substrates: this is the case, for example, for automotive glazing, particularly windshields, to avoid the driver being disturbed by undesirable reflections which may be substantial, particularly in the case of light-colored dashboards. The need may finally be justified for functional reasons, for example in the case of glazing covering photovoltaic cells of solar panels generating electricity. In this case, any increase in the transmittance of the glazing (for example by decreasing the intensity of the reflected rays) procures a substantial energy gain.

Miscellaneous coatings have been developed to meet this need, both with inorganic and organic substrates. They are designed to decrease the light reflectance of a given substrate, or even to eliminate it in certain cases. In general, a coating is considered to have an antireflection function when it has a lower reflectance than that of the uncoated substrate.

The physical principle common to these coatings consists in creating various interfaces giving rise to multiple reflections which mainly interfere destructively.

Such coatings for ophthalmic lenses are, for example, described in patent application FR 2 721 720. They may be rudimentary, consisting of a single film of dielectric materials of which the optical thickness (that is the product of the geometric thickness multiplied by the refractive index of the material) is equal to $\lambda/4$, where $\lambda$ is a wavelength averaged in the visible range, hence around 550 nm. In this case, a low light reflectance is only obtained for almost normal incidences of the light ray. For the other angles of incidence, reflected colors varying with the angle of incidence or observation attest to the only partially destructive nature of the interference created. Antireflection coatings may also be more complex and comprise at least 3 or 4 layers to improve these esthetic aspects. They may also be required to meet stringent specifications in terms of mechanical or thermomechanical strength or abrasion resistance. Patent application FR 2 841 894 accordingly describes antireflection coatings intended for glazing having to undergo bending treatments, therefore high mechanical loads at high temperatures. These coatings consist of stack of at least four layers, with layers having a high refractive index alternating with layers having a low index, each layer also having a clearly defined optical thickness.

The major drawback of this type of coating stems from the fact that their optical effect is extremely affected by dirt, particularly organic dirt. In other words, it has appeared that these antireflection coatings make the dirt much more visible, even if the dirt is very thin, because it alters the optical path of the reflected rays by adding undesirable interfaces, thereby disturbing the interference effects. Thus, organic pollution of the "fingerprint" type, is particularly revealed by the antireflection coatings, for example on ophthalmic lenses or shop counters.

Simultaneous with research conducted on antireflection coatings, anti-soiling coatings have also been emerging within the last 10 years, chiefly based on the photocatalytic activity of titanium dioxide. Titanium dioxide, particularly when it is crystalline, at least partially, in the "anatase" crystallographic form, serves, under the effect of radiation, particularly ultraviolet radiation, to catalyze the oxidation by free radical reactions, and hence the degradation, of organic molecules. The underlying physical mechanism is the creation of an electron-hole pair under the effect of the radiation whereof the energy is greater than or equal to the energy "gap" between the valence and conduction bands of titanium dioxide. These coatings, described for example in application EP 850 204, also have photoinduced hydrophilic properties conferring self-cleaning functions on the material. The surface made hydrophilic in fact allows for easy cleaning, both of organic waste and inorganic dust, for example by rainwater. This hydrophilic property also confers an anti-fogging effect on the material, the water having a tendency to coat the material in the form of a transparent film rather than form droplets.

Photocatalytic titanium dioxide coatings can be formed by various deposition methods, for example, by chemical vapor deposition (CVD), (as described in abovementioned application EP 850 204), by the cathode sputtering method (application FR 2 814 094 presents a particular method thereof), or by "sol-gel" processes.

The titanium dioxide may be partly introduced in the form of nanoscale crystalline particles embedded in an inorganic or organic binder as described in application FR 2 738 812, or it may be created in situ as in abovementioned application FR 2 814 094. Another means is to use the sol-gel process to deposit a mesoporous coating comprising at least partially crystalline titanium dioxide, particularly in the form of perfectly discernible particles. This particular method, described in application FR 2 838 734, confers increased photocatalytic activity on the product obtained.

An example of the combination of the two anti-soiling and antireflection functions in the same material is described in document EP-A-1 291 331, in which titanium dioxide films less than 100 nanometers thick deposited by the magnetron sputtering process overlay stacks of layers. After the deposition, production of the anatase phase, which improves the photoinduced hydrophilic properties, is favored by heat treatment between 100 and 250° C. It has appeared, however, that these deposition conditions do not produce layers having a rapid rate of degradation of organic dirt. Moreover, the stacks described have very wide variations in reflectance properties according to the thickness of the photocatalytic coating, entailing the extremely accurate control of said thickness during the deposition of said coating. Finally, most of the stacks described contain at least one metal layer, which has the effect of sharply decreasing the light transmittance of the coated substrate. The stacks proposed, particularly those not comprising a metal layer, have a reflectance spectrum that is highly dependent on the wavelength and particularly reflectance values that are substantially higher than the reflectance of the uncoated glass for wavelengths of 400 nm and/or 700 nm.

It is therefore an object of the invention to overcome these drawbacks and propose a material for rapidly removing organic dirt, under outdoor and indoor conditions, and having a low reflectance over the widest possible range of wavelengths. Another object of the invention is to propose a material such that the photocatalytic coating can be deposited by an economical method. A further object of the invention is to propose a material having good chemical resistance and mechanical strength.

The principal subject of the invention is a transparent or semitransparent substrate having, on at least part of at least one of its sides, a photocatalytic coating based on titanium dioxide, all the deposited coatings conferring an antireflection function on said substrate.

In the context of the present invention, antireflection coating means a coating which, for the coated side, confers a light reflectance lower than that conferred by an uncoated side of the substrate.

The coating of the invention advantageously has high photocatalytic activity, defined as being an activity, under outdoor irradiation conditions ($k_{ext}$), expressed as the rate of degradation of stearic acid, which is greater than or equal to $1 \times 10^{-2}$ cm$^{-1}$/min.

The total light reflectance for the coated side of the material is preferably lower than or equal to 80%, particularly to 60%, and even to 40%, indeed to 20% or 15%, of the reflectance of an uncoated side of the substrate. According to a preferred embodiment of the invention, the reflectance of a coated side is lower than the reflectance of an uncoated side of the substrate over the entire 400-800 nm range, corresponding to the range of wavelengths of visible radiation.

In the case of a soda-lime-silica glass, the reflectance of each side is about 4%. The coating of the invention hence preferably provides a reflectance per side that is lower than or equal to 3.2%, particularly to 2.4%, indeed to 1.6%, and even to 0.8 or 0.6%. When both sides of the material are coated according to the invention, the total reflectance in the case of a soda-lime-silica glass substrate may therefore be lower than or equal to 1.2%.

The substrate may be inorganic, for example, glass or glass-ceramic, or organic. In the latter case, various rigid or flexible plastics can be employed, such as polymethyl methacrylate (PMMA), polycarbonate (PC), polypropylene, polyurethane, polyvinyl butyral, polyethylene glycol terephthalate, polybutylene glycol terephthalate, ionomer resin such as ethylene/(meth)acrylic acid copolymer neutralized by a polyamine, cycloolefine copolymer such as ethylene/norbornene or ethylene/cyclopentadiene copolymers, polycarbonate/polyester copolymer, ethylene/vinyl acetate copolymer and similar polymers, alone or in blends thereof. More specifically in the field of ophthalmic lenses, the substrates employed can also be obtained by polymerization of bis-diethylene glycol allylcarbonate (available under the trademark CR39® from PPG Industries Inc.), or may be substrates based on (meth)allylic or (meth)acrylic polymer, (more particularly those obtained from monomers or prepolymers derived from bisphenol A, used alone or in blends with other copolymerizable monomers), based on polythiourethane, or based on polystyrene or diallyl phthalate resin.

Since pure titanium dioxide is one of the materials having the highest refractive index (respectively 2.75 and 2.57 for the rutile and anatase crystallographic forms), a person skilled in the art is not encouraged to envisage the combination of the photocatalytic and antireflection effects. This combination is considered as incompatible, because the high refractive index layers will destroy the antireflection function, or at least degrade it substantially. In the context of the present invention, the inventors have selected preferential embodiments in which the photocatalytic coating has a refractive index lower than 2, preferably lower than 1.9, indeed than 1.8, and particularly lower than 1.7, indeed than 1.6. In a particularly preferred manner, the refractive index of the photocatalytic coating is even lower than or equal to 1.5. In this way, it has proved to be surprisingly feasible to obtain a true combination of the photocatalytic and antireflection functions, in which the reflectance of the material remains lower than the reflectance of the uncoated substrate. This differs from what is known from the prior art, in which intermediate layers are sometimes placed under the photocatalytic coating for the sole purpose of attenuating the light reflectance thereby, without however obtaining a lower reflectance than that of the bare substrate.

For an application in the optical and ophthalmic field, it is also preferable for the photocatalytic activity to be extremely intense, so that the dirt can only disturb the view for a very short time. This is particularly preferable in the case of persons who spend most of their time indoors, where exposure to sunlight, particularly in the ultraviolet (UV) range is low. Outdoors, the average intensity of UVA radiation (in the 315-400 nm wavelength range) is, for example, about 50 W for an irradiated area of 1 m$^2$; it drops to less than 2 W/m$^2$ indoors, particularly because of the filtering power of the glazing.

The substrate of the invention is therefore preferably coated with a photocatalytic coating whereof the activity under outdoor irradiation conditions ($k_{ext}$), expressed as the rate of stearic acid degradation, is higher than or equal to $1 \times 10^{-2}$, particularly $2 \times 10^{-2}$, indeed $3 \times 10^{-2}$ cm$^{-1}$/min, and even $3.5 \times 10^{-2}$ cm$^{-1}$/min.

The photocatalytic coating advantageously has, under indoor irradiation conditions, an activity ($k_{int}$), expressed as a weight percentage of stearic acid degraded after two hours of irradiation, greater than 15%, particularly greater than 20%, and preferably greater than 30%, indeed 40%, and even 50%.

The rate of stearic acid degradation expresses the rate of decrease of the area of the stretching vibration bands of the $CH_2$—$CH_3$ groups measured by Fourier transform infrared spectroscopy (FTIR) under conditions described in detail below.

The conditions for measuring the photocatalytic activity, both under indoor and outdoor lighting conditions, are given in detail in the description of the examples according to the invention.

According to a preferred embodiment of the invention, the photocatalytic coating is characterized by a mesoporous structure, preferably produced by the sol-gel process, comprising at least partially crystalline titanium dioxide, particularly in anatase and/or rutile form. The mesoporous structure serves, in fact, to substantially increase the specific surface area of the material, thereby considerably increasing the photocatalytic activity. Furthermore, porous, and hence low-density inorganic materials generally have a low refractive index, which is lower as the porosity increases.

The term "mesoporous" refers here to pores with diameters of between 2 and 50 nm. The mesoporous structure is based on at least one compound of at least one of the elements Si, W, Sb, Ti, Zr, Ta, V, B, Pb, Mg, Al, Mn, Co, Ni, Sn, Zn, In, Fe and Mo, if possible in a covalent bond with elements such as O, S, N, C.

With the exception of titanium dioxide, the mesoporous structure preferably consists mainly of silica ($SiO_2$), to confer a low overall refractive index on the coating according to the invention.

When the mesoporous structure contains silica, it has appeared advantageous to the inventors to select a coating having a Ti/Si atomic ratio preferably of between 0.25 and 2, particularly between 0.6 and 1.2, indeed substantially equal to 1. The coatings having low Ti/Si ratios do not in fact have the desired photocatalytic properties, whereas the high Ti/Si ratios confer higher refractive indexes on the material.

The pore network, advantageously obtained using organic structuring agents, preferably has a medium- or long-range order (a few nanometers to a few microns).

The at least partially crystalline titanium dioxide is, for example, incorporated into the mesoporous structure in the form of perfectly discernible particles. It is optionally doped or combined with other materials to increase the photocatalytic activity or to create a more intense activity in the visible wavelength range (as explained in applications WO 97/10185 and WO 97/10186 incorporated here for reference), and comprises nanoparticles having diameters of between 0.5 and 100 nm, particularly between 1 and 80 nm, themselves consisting of clusters of grains or elementary crystallites having diameters of between 0.5 and 10 nm. The term "diameter" should be considered here in the broad sense, and is rather an evaluation of the size of the nanoparticle or the crystallite. The shape thereof may approach a sphere, or an elongated rice grain shape or a completely random shape. The overall mesoporous structure incorporating the titanium dioxide is essentially solid, having good cohesion, and excellent mechanical strength and abrasion resistance. The mesoporous structure may be composed exclusively of titanium or a titanium compound such as its oxide, particularly crystallized in anatase and/or rutile form. It has proved that the titanium dioxide thus incorporated exerts its photocatalytic activity to an exceptionally high degree. Thus a residual ultraviolet radiation, after having passed through a single or multiple glazing, or a residual ultraviolet radiation issuing from an indoor electrical lighting fixture suffices for the substrate according to this preferred embodiment of the invention for it to degrade an organic waste, and for the latter then to be entrained in a relatively uniform liquid film that is formed as applicable on the substrate made hydrophilic by the radiation. The coating of the invention therefore combines the function of degradation of organic waste—by photocatalysis—and the removal of the organic and inorganic waste—hydrophilic/oleophilic character—under the effect of any liquid, such as condensation. The high performance procured by this preferred embodiment of the invention can perhaps be attributed at least partly to the interconnection of the pore network, providing good access of the pollution to the titanium dioxide particles, and also good diffusion in the coating of the species photogenerated at the surface of these particles.

Furthermore, the abrasion resistance and durability of the photocatalytic activity to such a high degree are excellent. This preferred embodiment of the invention therefore also serves to preserve the porosity after abrasion, whereas abrasion would normally be expected to have the result of densifying the surface layer and hence ultimately causing a loss of the anti-soiling properties.

According to a preferred embodiment of the invention, a monolayer film or a multilayer stack is inserted between the substrate and the photocatalytic coating in order to reduce the light reflectance of the substrate of the invention more effectively.

The multilayer stack preferably does not comprise a metal layer, particularly based on silver, titanium or platinum. The presence of these layers in fact sharply decreases the light transmittance of the coated substrate. The inventors have also determined that their presence lowers the mechanical strength and chemical resistance.

The coating thus inserted preferably consists of thin dielectric layers having alternating high and low refractive indexes and comprising in succession:
- a first high-index layer 1, having a refractive index $n_1$ of between 1.8 and 2.3 and a geometric thickness $e_1$ of between 5 and 50 nm,
- a second low-index layer 2, having a refractive index $n_2$ of between 1.35 and 1.65 and a geometric thickness $e_2$ of between 10 and 60 nm,
- a third high-index layer 3, having a refractive index $n_3$ of between 1.8 and 2.5 and a geometric thickness $e_3$ of between 40 and 150 nm.

The photocatalytic coating based on titanium dioxide accordingly constitutes a fourth layer, placed on layer 3. To optimize the antireflection properties of the overall coating, particularly to obtain very low reflectances, its geometric thickness $e_4$ is preferably of between 40 and 150 nm.

In the context of the invention, "layer" means either a single layer or a superimposition of layers in which each layer has the refractive index indicated and in which the sum of their geometric thicknesses also remains equal to the value indicated for the layer in question.

In the context of the invention, the layers are made from a dielectric material, particularly of the oxide, nitride or oxynitride type of a metal or semiconductor element. However, it is possible for at least one of them to be modified to be slightly conducting, for example by doping a metal oxide, for example, to also confer an antistatic function on the antireflection stack.

These preferable thickness and refractive index criteria serve to obtain an antireflection effect having a wide band of low light reflectance (that is, such that the coated side has a reflectance lower than the reflectance of an uncoated side of the substrate over the entire 400-800 nm range), also having a neutral color in transmission and good esthetics in reflection, regardless of the angle of incidence at which the substrate thus coated is observed.

The most suitable materials for producing the first and/or third layer of the stack, having a high index, are based on metal oxide(s) selected from titanium dioxide ($TiO_2$), zinc oxide (ZnO), stannic oxide ($SnO_2$), zirconium oxide ($ZrO_2$), or mixed oxides of a plurality of these oxides, for example mixed tin-zinc oxides ($Sn_xZn_yO_z$), mixed zinc-titanium dioxides ($TiZnO_x$) or silicon-titanium dioxides ($Si_xTi_yO_z$), or titanium-zirconium oxides ($Ti_xZr_{(1-x)}O_2$). They may also be based on nitride(s) selected from silicon nitride ($Si_3N_4$) and/or aluminum nitride (AlN), or a mixed silicon/zirconium nitride ($SiZrN_x$). All these materials can optionally be doped to improve their chemical resistance and/or mechanical strength and/or electrical resistance properties.

The most suitable materials for the second layer of the stack A, having a low index, are based on silicon oxide, silicon oxynitride and/or oxycarbide, or based on a mixed silicon aluminum oxide. Such a mixed oxide tends to have better durability, particularly chemical, than pure $SiO_2$ (an example thereof is given in patent EP-791 562). The respective proportions of the two oxides can be adjusted to improve the anticipated durability without excessively increasing the refractive index of the layer.

To confer thermomechanical resistance properties on the material of the invention (for example to improve the bending resistance of glass for counters), the stack on which the photocatalytic coating is deposited is preferably prepared according to the teachings of patent FR 2 841 894 incorporated here for reference.

In the context of the embodiment according to which the photocatalytic coating is formed by a sol-gel process, the coating or the stack inserted between the substrate and said photocatalytic coating is advantageously optimized so that variations in thickness of the photocatalytic coating, inherent in this type of process, do not substantially affect the value of the light reflectance.

In general and to meet one of the objects of the invention, the coated substrate is advantageously such that the extent of the thickness range of said photocatalytic coating for which the reflectance of the coated substrate remains lower than the reflectance of the uncoated substrate (indeed lower than 80%, 60% or even 40% of this value) represents at least 15%, indeed 25% and even 30% or 50% of the median value of this range. The advantage of this embodiment lies in a greater simplicity of deposition, since the thickness control does not need to be extremely precise. This advantage is particularly accentuated when the photocatalytic coating is obtained by the sol-gel process, for which it is difficult to fully control the thickness or to obtain a perfectly uniform thickness.

A further object of the invention relates to the method for obtaining a substrate as described above, this method comprising the following steps in succession:
  the formation of a "sol" comprising at least one precursor of the material constituting the mesoporous structure of the coating and at least one organic structuring agent diluted in a solvent,
  a sol "maturing" step corresponding to the incipient precipitation of the precursor around the organic structuring agent and the growth of molecules derived from the precursor,
  the addition of optionally doped titanium dioxide nanoparticles or crystallites to the sol, whereof the characteristic sizes are comprised between 0.5 and 100 nm,
  the application of the sol to at least one surface of the substrate to be coated,
  the removal of the solvent,
  the removal of the organic structuring agent.

The sol preferably contains at least one oxide precursor, for example a hydrolyzable compound such as an alkoxide or a halide, and advantageously at least one precursor of silica ($SiO_2$), such as, for example, tetraethoxysilane (TEOS) or tetramethoxysilane (TMOS). The silica precursors preferably represent the majority, or even the totality of the precursors of the material of the mesoporous structure. It may also contain at least one titanium dioxide precursor, such as titanium tetrabutoxide or titanium tetraethoxide.

The structuring agent is advantageously selected from cationic surfactants, preferably of the quaternary ammonium type, such as cetyltrimethylammonium bromide (CTAB) or nonionic surfactants, such as di block or tri block copolymers based for example on ethylene or propylene oxide.

The organic structuring agent can also be added after the sol preparation and maturing steps, the latter step allowing preliminary condensation of the precursor to favor the structuring of the oxide coating condensed on the support surface in wide dimensional ranges. Advantageous maturing conditions comprise the maintenance of the sol at a temperature of 40 to 60° C. for a period of 30 min to 24 hours, the maturing time being shorter at higher temperature.

The solvents used are preferably alcohols, particularly ethanol, which has the advantage of being nontoxic.

The application of the sol to the substrate can be carried out by sol-gel deposition techniques well known to a person skilled in the art, like those described in patent application EP-A-850 204 already mentioned and incorporated here for reference, for example:
  spin coating (deposition on a rotating substrate),
  dip coating or dipping (immersion of the substrate in the sol then removal at a controlled rate),
  laminar coating,
  cell coating, the substrates to be coated forming a narrow cavity (or "cell") bounded by two substantially parallel sides filled with the sol to be deposited and then drained in a controlled manner,
  spray coating techniques (spray-gun, etc.).

When the substrate is made from plastic, it is advisable for the steps after the application of the sol to at least one surface of the substrate to take place at temperatures below 150° C., preferably below 100° C. or even lower than or equal to 80° C., indeed 60° C., to avoid degrading the substrate and/or creating mechanical stresses that could weaken the substrate and/or the various coatings due to the wide difference in expansion coefficients between the organic and inorganic materials.

In this context, one particularly preferred embodiment of the invention consists in consolidating the coating at temperatures of between 50 and 80° C., and, successively or simultaneously, removing said organic structuring agent not thermally, but through irradiation, for example under ultraviolet radiation. The presence of titanium dioxide with photocatalytic properties then proves to be capable of rapidly degrading the totality of the structuring agents.

The inventors have discovered an additional advantage of these treatments carried out at low temperature, which confer higher porosity and hence higher photocatalytic activity on the coatings.

Functional layers or stacks thereof can also be inserted between the substrate of the invention and the layers with an antireflection and photocatalytic function. They may consist of antistatic or thermal (low-emissivity, solar protection, etc.) functional layers, particularly selected based on a conducting material of the metal type (for example silver) or of the doped metal oxide type such as tin-doped indium oxide ITO, aluminum-doped zinc oxide ZAO, tin oxide doped with a halogen such as fluorine or with antimony.

These layers may also have a hardness making them suitable for scratch-resistant or abrasion-resistant functions, particularly useful in the case of ophthalmic lenses. These layers may be organic or inorganic, or even hybrid organic/inorganic layers. In this latter family, mention can be made of hard abrasion-resistant coatings obtained by hardening a composition containing colloidal silica, optionally a crosslinking catalyst and a hydrolysate or a mixture of hydrolysates of silane compound(s) such as epoxidized alkoxysilanes and/or fluorinated alkylsilanes and/or nonepoxidized silanes. Particularly for ophthalmic applications, these abrasion-resistant layers are preferably deposited on or under a primary organic or hybrid impact-resistant layer, preferably based on polysiloxane.

Finally, they may be layers intended, in the case of organic substrates, for protecting said substrates against the photocatalytic action of the titanium dioxide, or in the case of a substrate based on inorganic glass, for preventing the migration of alkali metal ions from the glass into the photocatalytic layer. In the former case, the sublayer is preferably based on silica (for example obtained by a sol-gel process) or may consist of the scratch-resistant or abrasion-resistant layer described in the previous paragraph. In the latter case, the sublayer is preferably based on silicon oxycarbide. These layers may also, if applicable, belong to the stack of layers intended to decrease the overall reflectance of the material.

The substrate of the invention may also be a glazing having variable electrically controlled optical properties, such as electrochromic glazing, liquid crystal glazing for passing from a transparent state to a translucent state, or glazing made luminous by the insertion of a rare gas which may be the seat of light-emitting discharges, or light-emitting diodes.

A further subject of the invention is the use of such coated substrates as glazing, museum or shop windows, aquarium glass, glazing for interior or urban furniture, ophthalmic lenses, glazing for display screens, glazing for solar panels producing heat and/or electricity, glazing for automobiles, ships or aircraft, mirrors, particularly for rearview mirrors and headlight optics for automobiles, lighting devices.

The present invention will be better understood from a reading of the detailed description below of nonlimiting exemplary embodiments.

EXAMPLE 1

A clear soda-lime-silica glass substrate 4 mm thick and sold by Saint-Gobain Glass under the trade name SGG Planilux® produced by the float process is coated on both sides by a magnetically enhanced cathode sputtering method (called the "magnetron sputtering" process) with the following stack of three layers:

| Glass | | |
|---|---|---|
| $Si_3N_4$ | $SiO_2$ | $TiO_2$ |
| 20.2 nm | 22.1 nm | 95.9 nm |

(The same stack is present on the opposite side.)

The first layer has a refractive index of 2.04 at 550 nm.

For the second and third layers, these values are respectively 1.48 and 2.33 at 550 nm.

A photocatalytic coating with a mesoporous structure is formed on the two sides of the material obtained.

The liquid treatment composition is obtained by mixing in a first step 22.3 ml of tetraethoxysilane, 22.1 ml of absolute ethanol, 9 ml of HCl in demineralized water until the solution becomes clear (final pH 1.25), and then placing the flask in a water bath at 60° C. for 1 h.

In a second step, an organic structuring agent is added to the sol previously obtained, in the form of a solution of a polyoxyethylene/polyoxypropylene block copolymer sold by BASF under the registered trademark Pluronic PE6800 (molecular weight 8000), in proportions such that the PE6800/Si molar ratio is 0.01. This is obtained by mixing 3.78 g of PE6800, 50 ml of ethanol and 25 ml of the sol.

Nanoparticles of $TiO_2$ crystallized in the anatase form having a size of about 50 nm are added to the liquid composition thus obtained before deposition on the sample. The deposition is carried out on the two sides of the sample by cell coating.

The samples then undergo heat treatment at 250° C. for two hours to consolidate the mesoporous coating and to remove the solvent and the organic structuring agent.

The pores of the coating thus formed have a size of 4-5 nm.

SIMS (Secondary Ion Mass Spectroscopy) analysis of the coating having a mesoporous structure confirms that the Ti/Si atomic ratio is exactly identical to that of the initial liquid composition. This Ti/Si ratio is selected at 1. The SIMS analysis also serves to check that the nanoparticles are distributed uniformly in the three dimensions of the coating.

The thickness $e_4$ of the photocatalytic coating in nm is measured from SIMS profiles and SEM (Scanning Electron Microscope) images and is 72 nm. In the present case, the multilayer stack inserted under this coating is optimized so that the light reflectance of the final material is only slightly affected by changes in the thickness of the photocatalytic coating. In the present case, the thickness of the photocatalytic coating may vary from 60 to 100 nm.

The refractive index of this coating is measured by ellipsometry techniques well known to a person skilled in the art. It is 1.54 at 550 nm.

The reflectance measurements are taken using a UV-visible spectrophotometer. The light reflectance values ($R_L$) and colorimetric parameters ($a^*$, $b^*$) are calculated between 380 and 780 nm from an experimental reflection spectrum at almost normal incidence using as references the D65 illuminant as defined by standard ISO/CIE 10526 and the CIE 1931 observer as defined by standard ISO/CIE 10527.

The photocatalytic activity is measured as follows:

cutting of samples measuring 5×5 $cm^2$, cleaning of the samples for 45 minutes under UV irradiation and oxygen blanket, measurement of the infrared spectrum by FTIR for wavenumbers of between 4000 and 400 $cm^{-1}$, to prepare a reference spectrum, deposition of stearic acid: 60 microliters of a stearic acid solution dissolved in an amount of 5 g/l in methanol are deposited by spin coating onto the sample, measurement of the infrared spectrum by FTIR, measurement of the area of the $CH_2$—$CH_3$ bond stretching bands between 3000 and 2700 $cm^{-1}$, exposure to UVA-type radiation: the power received by the sample, respectively about 35 W/$m^2$ and 1.4 W/$m^2$ to simulate outdoor and indoor exposure, is controlled by a photocell in the wavelength range 315-400 nm. The nature of the lamps is also different according to the lighting conditions: hot white fluorescent tubes reference Philips T12 for indoor exposure, UV Philips Cleo Performance light bulbs for outdoor exposure, monitoring of the photodegradation of the stearic acid layer after successive exposure times of 10 minutes by measuring the area of the $CH_2$—$CH_3$ bond stretching bands between 3000 and 2700 $cm^{-1}$, the photocatalytic activity under outdoor conditions $k_{ext}$ is defined by the slope, expressed in $cm^{-1} \cdot min^{-1}$, of the line representing the area of the $CH_2$—$CH_3$ bond stretching bands between 3000 and 2700 $cm^{-1}$ according to the UV exposure time, for a duration of between 0 and 30 minutes, the photocatalytic activity under indoor conditions $k_{int}$ is defined as the weight percentage of stearic acid degraded (calculated from the infrared spectrum) after two hours of illumination.

Under these conditions, the following measurements are obtained:

$K_{ext}=3.0\times10^{-2}$ cm$^{-1}$/min $K_{int}=20\%$.

The light reflectance $R_L$ is 1%.

The calorimetric parameters (a*,b*) are (0,0), attesting to a perfectly neutral color.

The reflectance on a coated side is hence 12.5% of the reflectance on an uncoated side of the substrate.

EXAMPLE 2

Comparative

This example is described in application FR 2 814 094, in which it is Example 4.

Only one side of the substrate is treated, the material thus comprising as follows:

| Glass | | |
|---|---|---|
| $Si_3N_4$ | $SiO_2$ | $TiO_2$ |
| 25 nm | 22 nm | 104 nm |

The photocatalytic coating consists here of a layer of $TiO_2$ obtained by cathode sputtering.

The light reflectance is 15.8%, which means that the treated side has a light reflectance of about 11.8%, or nearly three times the reflectance of an uncoated side of the substrate. Hence, this coating cannot be qualified as antireflection in the context of the present invention, even if it is thus qualified in the application where it is described.

EXAMPLE 3

A polycarbonate-based substrate is used here, intended for the production of ophthalmic lenses, of index 1.586 and coated with an abrasion-resistant coating obtained by hardening a solution composed of colloidal silica and a hydrolysate of an epoxidized alkoxysilane.

This substrate is coated with a photocatalytic coating under conditions similar to those described in Example 1.

The differences from the conditions in Example 1 are as follows:
  the consolidation treatment and removal of the solvent and structuring agent cannot be carried out at high temperature because of the low thermal resistance of the substrate. These treatments are therefore replaced by a consolidation heat treatment carried out at 60° C. for three hours under UV irradiation. This final step serves to degrade the structuring agent thanks to the photocatalytic action of titanium dioxide,
  the Ti/Si ratio is 0.25.

In this case, the abrasion-resistant coating also has the advantage of preventing any degradation of the polycarbonate substrate by photocatalysis.

The index of the photocatalytic layer is 1.39 at 550 nm, its thickness is about 100 nm.

The light reflectance of a coated side is 1.05% or 22% of the reflectance of an uncoated side of the substrate. The calorimetric parameters (a*,b*) are (5.6;7.6).

The photocatalytic coating is hence capable in this case of conferring an antireflection function on the substrate, but weaker than obtainable with a more complex coating.

EXAMPLE 4

Comparative

This example resumes the same conditions as Example 3, with the only difference that the Ti/Si ratio is 2.

In this case the index of the photocatalytic coating is 1.61 at 550 nm, and the light reflectance of the material is 9.72%, higher than the reflectance of the uncoated substrate.

The increase in the titanium content of the photocatalytic coating has in fact caused an increase in the refractive index, detrimental to the possibility of obtaining an antireflection function.

EXAMPLE 5

This example resumes the conditions of Example 4, but with the insertion of a stack of layers obtained by vacuum evaporation between the photocatalytic coating and the abrasion-resistant coating. This stack comprises a first layer based on zirconium and titanium dioxides, a second layer based on silica, a third layer based on titanium dioxide according to the following configuration:

| Polycarbonate | | |
|---|---|---|
| $ZrTiO_x$ | $SiO_2$ | $TiO_2$ |
| 36 nm | 15 nm | 56 nm |

The following are thus obtained:
a light reflectance $R_L$ of 1.21%;
calorimetric parameters (a*,b*) of (5.9;−5.8);
the reflectance of a coated side hence represents 12.5% of the reflectance of an uncoated side of the substrate.

This substrate is thus particularly suitable for being used for ophthalmic lenses. In fact it has the following added advantages:
  very high photocatalytic activity indoors and outdoors, for example, guaranteeing a rapid disappearance of fingerprints,
  low light reflectance and relatively neutral color.

EXAMPLE 6

This example roughly repeats the operating conditions of Example 1.

The differences are as follows:

The Ti/Si ratio is 0.25. The refractive index of the photocatalytic coating is 1.3.9 at 550 nm, and its thickness is 97 nm. The latter quantity may however vary between 70 and 120 nm without substantially affecting the light reflectance, representing a range of variation whereof the extent is more than 50% with regard to the median value of this range.

The thicknesses of the layers of the stack inserted between the substrate and the photocatalytic coating are:

| Glass | | |
|---|---|---|
| $Si_3N_4$ | $SiO_2$ | $TiO_2$ |
| 18.2 nm | 43.9 nm | 113.4 nm |

The following are thus obtained:

$R_L = 1\%$ $(a^*, b^*) = (0, 0)$ $k_{ext} = 1.0 \times 10^{-2}$ cm$^{-1}$/min.

The optical results are therefore similar to those obtained in Example 1.

EXAMPLE 7

This example resumes the operating conditions of Example 1, with the exception of the following conditions:

The substrate is made of extra-clear printed glass sold by Saint-Gobain Glass under the trademark SGG Albarino®. Only one side of the substrate is treated.

The Ti/Si ratio is 2. The refractive index of the photocatalytic coating is then 1.61 at 550 nm, and its thickness is 83 nm. The latter quantity may however vary between 70 and 100 nm without substantially affecting the light reflectance, representing a range of variation whereof the extent is 35% with regard to the median value of this range.

The thicknesses of the layers of the stack inserted between the substrate and the photocatalytic coating are:

| Glass | | |
|---|---|---|
| Si$_3$N$_4$ | SiO$_2$ | TiO$_2$ |
| 41.0 nm | 14.2 nm | 56.1 nm |

The following are thus obtained:

$R_L = 4.5\%$ $(a^*, b^*) = (1.1; -2.0)$ $k_{ext} = 4.9 \times 10^{-2}$ cm$^{-1}$/min.

The reflectance of the coated side is 0.6% or 15% of the reflectance of an uncoated side of the substrate.

The photocatalytic layer has a high Ti/Si ratio, and thus its activity is extremely intense.

This glass is employed for making photovoltaic panels. The combination of the antireflection and self-cleaning functions thereby serves to obtain a high and durable energy efficiency over time.

EXAMPLES 8 TO 10

These various examples differ from Example 1 in the nature of the stack inserted between the substrate and the photocatalytic coating, and optionally in the Ti/Si ratio.

This stack consists of the following layers:

| Glass | | |
|---|---|---|
| Si$_3$N$_4$ | SiO$_2$ | Si$_3$N$_4$ |
| e$_1$(nm) | e$_2$(nm) | e$_3$(nm) |

The third layer here is silicon nitride instead of titanium dioxide. This change is intended to improve the resistance of the stack to thermomechanical stresses occurring during the toughening or bending steps.

Table 1 lists the operating conditions and the results obtained for these three examples.

TABLE 1

| Ex | Ti/Si | e$_1$ (nm) | e$_2$ (nm) | e$_3$ (nm) | e$_4$ (nm) | Δe$_4$ (nm) | R$_L$ (%) | a* | b* |
|---|---|---|---|---|---|---|---|---|---|
| 8 | 0.25 | 13.5 | 43.6 | 146.9 | 89 | 60-130 | 1.0 | 0 | 0 |
| 9 | 1 | 20.9 | 25.4 | 70.5 | 84 | 60-100 | 1.0 | 7.8 | -9.5 |
| 10 | 2 | 16.3 | 33.1 | 67.2 | 85 | 70-100 | 1.6 | 17.4 | -21 |

The quantity Δe$_4$ represents the range of values of e$_4$ for which the reflectance remains substantially lower than that of the uncoated substrate. The extent of this range respectively represents 74%, 50% and 35% of the median value of the range.

The reflectances of the coated sides are respectively 12.5%, 12.5% and 20% of the reflectance of an uncoated side. Moreover, the reflectance of a coated side remains lower than the reflectance of an uncoated side of the substrate over the entire 400-800 nm range.

These glasses are particularly suitable for the production of show windows or counters for shops. The curved windows thus formed have the advantage of highlighting the objects placed on sale thanks to the antireflection function, while having effective self-cleaning action indoors.

EXAMPLE 11

Comparative

The example given in Table 1 of the abovementioned patent application EP-A-1 291 331 was reproduced according to the technical teaching contained in said application. The underlying stack and the 107.76 nm thick titanium dioxide layer were deposited by the magnetron sputtering process.

The activity k$_{ext}$ measured under outdoor conditions is $0.3 \times 10^{-2}$ cm$^{-1}$/min, which is quite insufficient to ensure rapid degradation of organic dirt. Moreover, as shown in FIG. 8 of the abovementioned application, a vary slight variation in thickness (in this case 7 nm) greatly modifies the value of the reflectance. Finally, the reflectance of the coated substrate is extremely dependent on the wavelength, the values obtained at 400 nm and 800 nm being extremely high.

The invention claimed is:

1. A composite product, comprising:
a transparent or semitransparent substrate;
a photocatalytic coating formed on at least part of at least one side of the substrate; and
a further coating positioned between the substrate and the photocatalytic coating to reduce the light reflectance, wherein the further coating comprises a multilayer stack that consists essentially of the following thin dielectric layers in succession:
a first high-index layer 1, having a refractive index n$_1$ of between 1.8 and 2.3 and a geometric thickness e$_1$ of between 5 and 50 nm,
a second low-index layer 2, having a refractive index n$_2$ of between 1.35 and 1.65 and a geometric thickness e$_2$ of between 10 and 60 nm, and
a third high-index layer 3, having a refractive index n$_3$ of between 1.8 and 2.5 and a geometric thickness e$_3$ of between 40 and 150 nm,
wherein:
the photocatalytic coating has a mesoporous structure comprising at least partially crystalline titanium dioxide;
the coated side of the substrate has a light reflectance between 380 and 780 nm that is lower than or equal to 40% of a light reflectance between 380 and 780 nm of the substrate that is uncoated; and wherein reflectance of the coated surface is lower than reflectance of the uncoated surface over an entirety of a range of wavelengths of incident light of from 400 to 800 nm.

2. The product of claim 1, wherein the multilayer stack does not comprise a metal layer.

3. The product of claim 1, wherein the light reflectance of the coated surface is less than or equal to 20% of the light reflectance of the uncoated surface.

4. The product of claim 1, wherein the light reflectance of the coated surface is less than or equal to 15% of the light reflectance of the uncoated surface.

5. The product of claim 1, wherein the extent of the thickness range of the photocatalytic coating for which the reflectance of the coated substrate remains lower than the reflectance of the uncoated substrate represents at least 15% of the median value of this range.

6. The product of claim 1, wherein the photocatalytic coating has a refractive index lower than 1.8 at 550 nm.

7. The product of claim 1, wherein the photocatalytic coating has a refractive index lower than 1.6 at 550 nm.

8. The product of claim 1, wherein the photocatalytic coating has an activity under outdoor lighting conditions, expressed as a rate of degradation of stearic acid, of greater than or equal to $1\times10^{-2}$ cm$^{-1}$/min.

9. The product of claim 1, wherein the photocatalytic coating has an activity under indoor lighting conditions, expressed as a weight percentage of degraded stearic acid, of greater than or equal to 15%.

10. The product of claim 1, wherein the photocatalytic coating has an activity under indoor lighting conditions, expressed as a weight percentage of degraded stearic acid, of greater than or equal to 30%.

11. The product of claim 1, wherein the mesoporous structure further comprises silica ($SiO_2$).

12. The product of claim 11, wherein a Ti/Si atomic ratio in the mesoporous structure is between 0.6 and 1.2.

13. The product of claim 1, wherein the at least partially crystalline titanium dioxide is incorporated in the mesoporous structure in the form of perfectly discernible particles.

14. The product of claim 1, further comprising a scratch-resistant or abrasion-resistant coating provided between the substrate and the further coating.

15. The product of claim 1, wherein:
the photocatalytic coating is formed on each of opposite sides of the transparent or semitransparent substrate,
the first high-index layer 1 is an $Si_3N_4$ layer,
the second high-index layer 2 is an $SiO_2$ layer, and
the third high-index layer 3 is a $TiO_2$ layer.

16. The product of claim 1, further comprising a scratch-resistant or abrasion-resistant coating provided between the substrate and the photocatalytic coating.

17. A glazing comprising the product as claimed in claim 1.

18. A method for producing the product of claim 1, comprising:
forming a sol comprising at least one precursor of a material forming the mesoporous structure of the photocatalytic coating and at least one organic structuring agent diluted in a solvent;
forming a mature sol;
adding titanium dioxide nanoparticles or crystallites to the sol, the nanoparticles having diameters from 0.5 to 100 nm;
applying the sol to at least one surface of the substrate;
removing the solvent; and
removing the organic structuring agent.

19. The method of claim 18, wherein:
the substrate comprises a plastic; and
removing the solvent and removing the organic structuring agent comprise removing at a temperature of 80° C. or less under UV irradiation.

20. An ophthalmic lens comprising the product as claimed in claim 16.

21. A method, comprising:
employing the product as claimed in claim 1 as a glazing in at least one product selected from the group consisting of ophthalmic lenses, windows, aquarium glass, furniture, display screens, solar panels, automobiles, ships or aircraft, mirrors, automobile rearview mirrors, headlight optics and lighting devices.

* * * * *